(12) United States Patent
Nguyen

(10) Patent No.: US 10,774,632 B2
(45) Date of Patent: Sep. 15, 2020

(54) METHOD OF FRACTURING A FORMATION USING A COMBINATION OF SPACER FLUID AND PROPPANT SLURRY

(71) Applicant: Halliburton Energy Services, Inc., Houston, TX (US)

(72) Inventor: Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/771,923

(22) PCT Filed: Dec. 2, 2015

(86) PCT No.: PCT/US2015/063511
§ 371 (c)(1),
(2) Date: Apr. 27, 2018

(87) PCT Pub. No.: WO2017/095407
PCT Pub. Date: Jun. 8, 2017

(65) Prior Publication Data
US 2018/0258747 A1    Sep. 13, 2018

(51) Int. Cl.
| | | |
|---|---|---|
| *E21B 43/267* | (2006.01) | |
| *C09K 8/80* | (2006.01) | |
| *C09K 8/60* | (2006.01) | |
| *C09K 8/88* | (2006.01) | |
| *C09K 8/66* | (2006.01) | |
| *C09K 8/68* | (2006.01) | |

(52) U.S. Cl.
CPC ............ *E21B 43/267* (2013.01); *C09K 8/601* (2013.01); *C09K 8/665* (2013.01); *C09K 8/68* (2013.01); *C09K 8/80* (2013.01); *C09K 8/88* (2013.01); *C09K 2208/08* (2013.01)

(58) Field of Classification Search
CPC ....... E21B 43/26; E21B 43/267; C09K 8/601; C09K 8/665; C09K 8/68; C09K 8/80; C09K 8/88; C09K 2208/08
See application file for complete search history.

(56) References Cited

U.S. PATENT DOCUMENTS

| | | |
|---|---|---|
| 5,330,005 A | 7/1994 | Card et al. |
| 5,439,055 A | 8/1995 | Card et al. |
| 5,472,050 A | 12/1995 | Rhoten et al. |
| 5,501,275 A | 3/1996 | Card et al. |
| 5,799,734 A | 9/1998 | Norman et al. |
| 6,172,011 B1 | 1/2001 | Card et al. |
| 6,439,310 B1 | 8/2002 | Scott, III et al. |

(Continued)

FOREIGN PATENT DOCUMENTS

WO     2016163983 A1    10/2016

*Primary Examiner* — Crystal J Miller
(74) *Attorney, Agent, or Firm* — Chamberlain Hrdlicka

(57) ABSTRACT

A method of fracturing a formation with a fracturing fluid in a wellbore extending into the formation includes pumping a spacer fluid through a spacer fluid channel into the wellbore and pumping a proppant slurry through a proppant slurry channel into the wellbore separately from the spacer fluid. The method further includes combining the spacer fluid and the proppant slurry within the wellbore to create the fracturing fluid with portions comprising varied proppant concentrations and pumping the fracturing fluid with the varied proppant concentrations into the formation.

17 Claims, 3 Drawing Sheets

(56) References Cited

U.S. PATENT DOCUMENTS

| | | |
|---|---|---|
| 7,281,581 B2 | 10/2007 | Nguyen et al. |
| 7,451,812 B2 | 11/2008 | Cooper et al. |
| 7,581,590 B2 | 9/2009 | Lesko et al. |
| 8,066,068 B2 | 11/2011 | Lesko et al. |
| 8,479,816 B2 | 7/2013 | Lesko |
| 8,490,700 B2 | 7/2013 | Lesko et al. |
| 8,584,755 B2 | 11/2013 | Willberg et al. |
| 8,636,065 B2 | 1/2014 | Lesko et al. |
| 8,757,259 B2 | 6/2014 | Lesko et al. |
| 8,763,699 B2 | 7/2014 | Medvedev et al. |
| 9,085,727 B2 | 7/2015 | Litvinets et al. |
| 9,091,164 B2 * | 7/2015 | Surjaatmadja ........... E21B 37/06 |
| 2006/0185848 A1 * | 8/2006 | Surjaatmadja ........... C09K 8/68 166/280.2 |
| 2010/0282464 A1 | 11/2010 | Medvedev et al. |
| 2011/0088915 A1 | 4/2011 | Stanojcic et al. |
| 2013/0056213 A1 | 3/2013 | Medvedev et al. |
| 2013/0161003 A1 | 6/2013 | Makarychev-Mikhailov et al. |
| 2014/0374093 A1 * | 12/2014 | Nguyen ................ E21B 43/267 166/280.1 |
| 2015/0083420 A1 | 3/2015 | Gupta et al. |
| 2015/0101808 A1 | 4/2015 | Saini et al. |
| 2015/0159465 A1 * | 6/2015 | Lecerf ..................... E21B 33/13 166/285 |
| 2017/0009129 A1 * | 1/2017 | Bryant ..................... C09K 8/80 |

* cited by examiner

METHOD OF FRACTURING A FORMATION USING A COMBINATION OF SPACER FLUID AND PROPPANT SLURRY

BACKGROUND

This section is intended to provide background information to facilitate a better understanding of the various aspects of the described embodiments. Accordingly, it should be understood that these statements are to be read in this light and not as admissions of prior art.

To produce hydrocarbons (e.g., oil, gas, etc.) from a subterranean formation, wellbores may be drilled that penetrate hydrocarbon-containing portions of the subterranean formation. The portion of the subterranean formation from which hydrocarbons may be produced is commonly referred to as a "production zone." In some instances, a subterranean formation penetrated by the wellbore may have multiple production zones at various locations along the wellbore.

Generally, after a wellbore has been drilled to a desired depth, completion operations are performed. Such completion operations may include inserting a liner or casing into the wellbore and, at times, cementing the casing or liner into place. Once the wellbore is completed as desired (lined, cased, open hole, or any other known completion), a stimulation operation may be performed to enhance hydrocarbon production into the wellbore. Examples of some common stimulation operations involve hydraulic fracturing, acidizing, fracture acidizing, and hydrajetting. Stimulation operations are intended to increase the flow of hydrocarbons from the subterranean formation surrounding the wellbore into the wellbore itself so that the hydrocarbons may then be produced up to the wellhead.

In some applications, it may be desirable to individually and selectively create multiple fractures at a predetermined distance from each other along a wellbore by creating multiple "pay zones." In order to maximize production, these multiple fractures should have adequate conductivity. The creation of multiple pay zones is particularly advantageous when stimulating a formation from a wellbore or completing a wellbore, specifically, those wellbores that are highly deviated or horizontal. The creation of such multiple pay zones may be accomplished using a variety of tools, which may include a movable fracturing tool with perforating and fracturing capabilities or actuatable sleeve assemblies disposed in a downhole tubular.

One typical formation stimulation process may involve hydraulic fracturing of the formation and placement of a proppant in those fractures. Typically, a fracturing fluid (comprising a spacer fluid and the proppant) is mixed at the surface before being pumped downhole in order to induce fractures in the formation of interest. The creation of such fractures will increase the production of hydrocarbons by increasing the flow paths in to the wellbore.

Oftentimes well operators attempt to "pillar frack" the formation, which involves introducing pulses or plugs of proppant into the spacer fluid cyclically, thereby providing the target production zone with a step-changed fracturing fluid. In theory, the step-changed fracturing fluid creates strategically placed proppant pillars within the fractured formation, thereby enhancing conductivity. The transition from the spacer fluid to a mixture of spacer fluid and proppant is an abrupt or sharp step-change. However, conventional methods of mixing the proppant and spacer fluid often result in a spreading of the transition between the spacer fluid and the proppant, thereby leading to a gradual transition rather than the desired step-change.

BRIEF DESCRIPTION OF THE DRAWINGS

For a detailed description of the embodiments of the invention, reference will now be made to the accompanying drawings in which.

DETAILED DESCRIPTION

Figure 1:
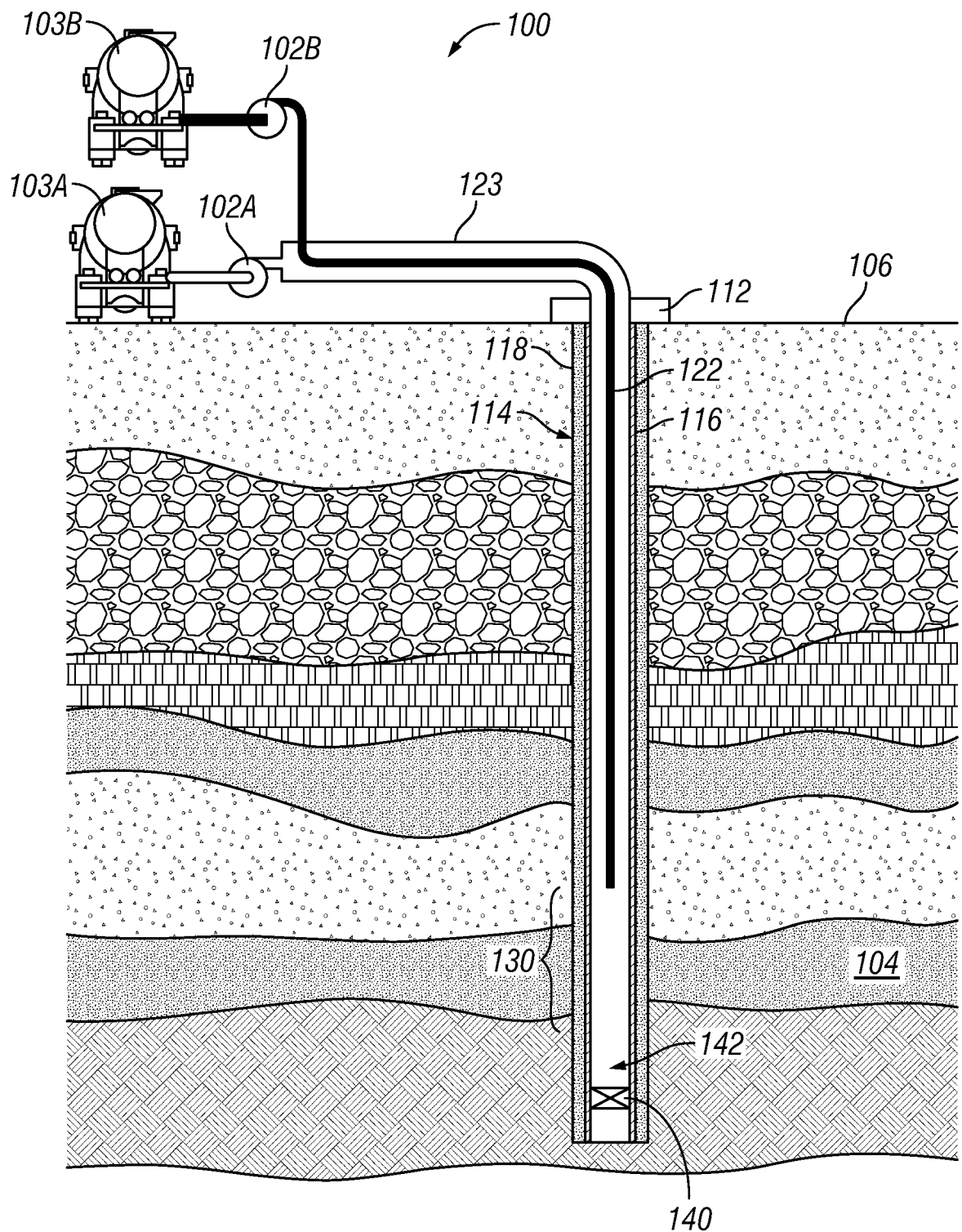
FIG. 1 depicts a schematic view of a pumping system for combining a proppant slurry and a spacer fluid, according to one or more embodiments.

While the disclosed methods and apparatus are discussed in terms of combining fluids to create a fracturing fluid for use in an oil and/or gas well, the same principles and concepts may be equally employed for combining a first fluid carrying a suspended solid with a second fluid without a suspended solid. For example, the methods and apparatus of the present disclosure may equally be applied to other fields or technologies. In addition, the second fluid could also contain suspended solids, of a different type, such as including different size solids or even a different chemical composition. One preferred type of a solid might include solids that tend to degrade in time to provide a higher permeability in a subterranean fracture, for example.

As used herein, the phrase "proppant slurry" or variations thereof refer to a proppant-carrying fluid that is a mixture of a granular solid, such as sand, with a liquid, such as water or a gel. The proppant slurry may be any mixture capable of suspending and transporting proppant in concentrations, such as above about 12 pounds of proppant per gallon of proppant slurry. The proppant slurry may have a proppant concentration that is the highest possible desired concentration of proppant in a combination of proppant and spacer fluid that might be needed during a particular job. In certain embodiments, the proppant slurry may contain up to 27 pounds of granular solid per gallon of fluid. In certain embodiments, the proppant slurry may also include other substances such as viscosity modifiers, thickeners, etc. In one exemplary embodiment, the proppant slurry may be LIQUID SAND™ a liquid proppant gel system commercially available from Halliburton Energy Services, Inc., of Houston, Tex.

In certain embodiments, the proppant slurry may comprise any water-containing fluid that does not adversely react with the subterranean formation or the other fluid constituents. For example, the fluid can comprise an aqueous mineral or organic acid, an aqueous salt solution such as potassium chloride solution, ammonium chloride solution, an aqueous organic quaternary ammonium chloride solution, or the like.

In certain embodiments, the proppant slurry may comprise a gelling agent that may comprise substantially any of the viscosifying compounds known to function in the desired manner. The gelling agent can comprise, for example, substantially any polysaccharide polymer viscosifying agent such as guar gum, derivatized guars such as hydroxypropylguar, derivatized cellulosics such as hydroxyethylcellulose, derivatives of starch, polyvinyl alcohols, acrylamides, xanthan gums, and the like. A specific example of a suitable gelling agent is guar, hydroxypropylguar, or carboxymethyl hydroxypropylguar present in an amount of from about 0.2 to about 0.75 weight percent in the fluid.

In certain embodiments, the proppant slurry may comprise a granular solid such as sized sand, resin-coated sand, sintered bauxite beads, metal beads or balls, ceramic particles, glass beads, polymer resin beads, ground nut shells, and the like. In certain embodiments, a portion of the proppant may be a bio-degradable material, so as to provide improved permeability. In certain embodiments, the bio-degradable portion may be in the range from about 5% to about 90% as designed by the user of the process. Further, in certain embodiments, the proppant used within the proppant slurry may have a coating, such as a curable resin.

As used herein, the phrase "spacer fluid" or variations thereof refer to a fluid that does not have significant amounts of proppant or other solid materials suspended therein. Spacer fluids may include brines and may also include water. The brines may also contain viscosifying agents or friction reducers. The spacer fluid may also be energized fluids such as foamed or comingled brines with carbon dioxide or nitrogen, acid mixtures or oil, based fluids and emulsion fluids. A spacer fluid may be a liquid or a gas, such as $CO_2$ or $N_2$.

Further, in certain embodiments, the spacer fluid may include fibers, such as degradable or non-degradable fibers. Suitable examples of degradable materials or fibers that may be used in accordance with the present disclosure include, but are not limited to, homopolymers, random, block, graft, and star- and hyper-branched aliphatic polyesters. Polycondensation reactions, ring-opening polymerizations, free radical polymerizations, anionic polymerizations, carbocationic polymerizations, coordinative ring-opening polymerization, and any other suitable process may prepare such suitable polymers. Specific examples of suitable polymers include polysaccharides such as dextran or cellulose; chitins; chitosans; proteins; aliphatic polyesters; poly(lactides); poly(glycolides); poly(ε-caprolactones); poly(hydroxybutyrates); poly(anhydrides); aliphatic polycarbonates; poly(orthoesters); poly(amino acids); poly(ethylene oxides); and polyphosphazenes. Further, suitable examples of non-degradable materials or fibers that may be used in accordance with the present disclosure include, but are not limited to, glass, ceramic, carbon, natural or synthetic polymers, or metal filaments.

The fibers may enhance the placement, bridging, or plugging of proppant or proppant aggregates within a formation fracture. This may enhance the suspension of the proppant aggregates while preventing the proppant aggregates from merging together or from being pushed out of the formation fracture. In particular, the fibers may be used to facilitate the spacer fluid carrying the proppant into and within the formation after the spacer fluid and the proppant slurry combine within the wellbore.

As used herein, the phrase "fracturing fluid," or variations thereof, refers to a mixture of a spacer fluid and a proppant slurry in any proportion.

Referring now to FIG. 1, a schematic view of a pumping system 100 used for combining a proppant slurry and a spacer fluid in accordance with one or more embodiments of the present disclosure is shown. It should be noted that, even though FIG. 1 depicts the pumping system 100 as being used with a land-based well system, it will be appreciated by those skilled in the art that the system 100, and various embodiments of the components disclosed herein, are equally well suited for use in other types of well systems, such as sea-based oil and gas drilling platforms, or rigs used in any other geographical location.

As illustrated in FIG. 1, a wellhead installation 112 is positioned on the ground surface 106 and, as depicted, a wellbore 114 extends from the wellhead installation 112 and has been drilled through various earth strata, including various submerged oil and gas formations 104. A casing string 116 is at least partially cemented within the main wellbore 114 with cement 118. The term "casing" is used herein to designate a tubular string used to line the wellbore 114. The casing may actually be of the type known to those skilled in the art as "liner" and may be segmented or continuous. Further, those having ordinary skill in the art will appreciate that though the wellbore 114 is shown as having casing 116 and cement 118, the present disclosure is not so limited, as the wellbore 114 may be open-hole and not have any casing or cement.

As shown, the well system 100 may further include one or more pumps, such as a first pump 102A and a second pump 102B, arranged at the surface and configured to pump fluids into the wellbore 114. The first pump 102A (e.g., a spacer fluid pump) is used to pump the spacer fluid through a spacer fluid channel 123 and into the wellbore 114. The second pump 102B (e.g., a proppant slurry pump) is used to pump the spacer fluid through a proppant slurry channel 122 and into the wellbore 114.

In one or more embodiments, the channels 122 and 123 may be any type of conduit or flow path that may be used to transport or carry a fluid. For example, the proppant slurry channel 122 may include a conduit, which may be coiled tubing, as shown, drill pipe, and/or any other type of tubular member known in the art. The spacer fluid channel 123 may additionally or alternatively also include a conduit. However, in this embodiment, the spacer fluid channel 123 is shown as an annulus formed about the conduit of the proppant slurry channel 122 and within the wellbore 114 such that the spacer fluid is pumped through the annulus.

The first pump 102A pumps a spacer fluid derived from a first source 103A into the annulus of the spacer fluid channel 123. As illustrated, the first source 103A may be a truck carrying a storage tank. In other embodiments, the first source 103A may be any fluid storage device, such as an integral portion of one or more manifold trailers, as known in the art. Pump 102A or 102B may also consist of a plurality of pumps as needed in the process, as is known in the art.

The second pump 102B may be fluidly coupled to the proppant slurry channel 122, which may extend within the spacer fluid channel 123. This arrangement may enable the spacer fluid to be pumped from the first pump 102A and generally bypass the proppant slurry channel 122 in the annulus defined between the proppant slurry channel 122 and the wellbore 114. The second pump 102B may be configured to pump a proppant slurry from a second source 103B into the proppant slurry channel 122. In certain embodiments, the proppant slurry channel 122 may deliver the spacer fluid while the spacer fluid channel 123 carries the proppant slurry. In certain embodiments, one or both of the first and second sources 103A and 103B may be mounted on mobile platforms, such as trailers (not shown in FIG. 1).

The spacer fluid and the proppant slurry are provided separately to and within the wellbore 114. The proppant slurry may then be injected into and otherwise combined with the spacer fluid, such as at the end of the conduit of the proppant slurry channel 122. The conduit of the proppant slurry channel 122 may end, or have an opening, arranged at or near a production zone 130 of the formation 104, in which the proppant slurry and the spacer fluid may then be combined above or at the production zone 130.

Figure 2:
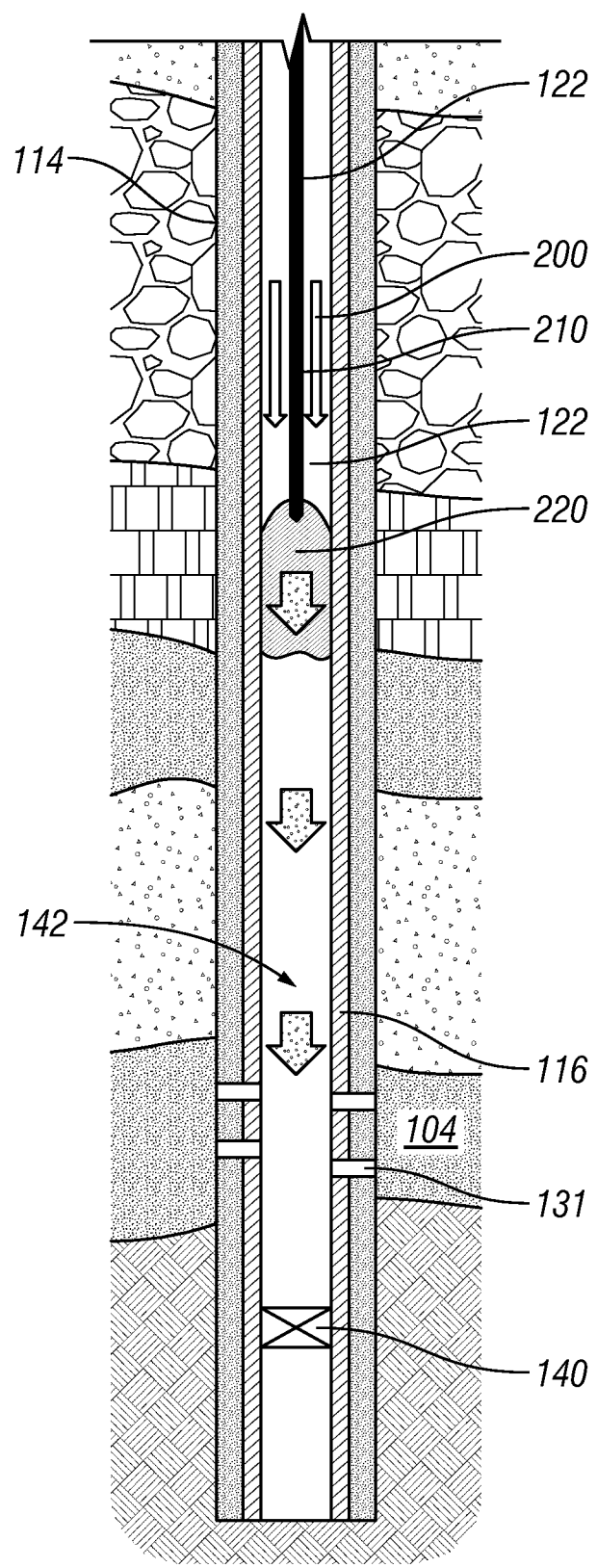
FIG. 2 depicts an enlarged partial cross-sectional view of a well system, according to one or more embodiments.

Referring now to FIG. 2, an enlarged partial cross-sectional view of the well system 100 in accordance with one or more embodiments of the present disclosure is shown. In particular, the conduit of the proppant slurry channel 122 depicted in FIG. 2 is arranged downhole within the wellbore 114 and substantially adjacent the formation 104 of interest. FIG. 2 depicts the flow of spacer fluid 200 along the annulus of the spacer fluid channel 123 within the casing string 116 and advancing towards an end or opening of the conduit of the proppant slurry channel 122.

FIG. 2 also depicts the proppant slurry channel 122 through which the proppant slurry 210 is flowing downward to the end of the conduit of the proppant slurry channel 122. A fracturing fluid 220 including the proppant slurry 210 and spacer fluid 200 is visible flowing downward from the end of the conduit of the proppant slurry channel 122 and toward one or more perforations 131 that extend from the open volume 142 within the wellbore 114 and through the casing string 116 and cement 118, thereby fluidly communicating the interior of the wellbore 114 with the formation 104.

A packer or plug 140, such as a bridge plug, may be located within the interior of the casing string 116 below the formation 104 and thereby define the open volume 142 thereabove. The plug 140 seals the wellbore 114 such that as the fracturing fluid 220 advances downward within the open volume 142, it is forced out through the perforations 131 and into the surrounding formation 104.

The fracturing fluid 220 is pumped or carried into the formation 104 to place proppant within fractures formed within the formation 104. In particular, the fracturing fluid 220 is pumped at a pressure above a fracturing pressure of the formation 104 to introduce or create fractures within formation 104, with the spacer fluid 200 carrying the proppant of the proppant slurry 210 into the fractures of the formation 104 to facilitate later production of the formation 104.

In order to enhance conductivity of the resulting fractures in the formation 104, the flow of the proppant slurry 210 and the flow of the spacer fluid 200 may be continuous and simultaneous with uninterrupted flow without any pulsing or cyclical pumping between the proppant slurry 210 and the spacer fluid 200. This may have the advantage of not only simplifying the pumping sequence of the spacer fluid 200, the proppant slurry 210, and ultimately the fracturing fluid 220, but may be easier and reduce or eliminate damage to the pumping equipment.

Figure 3:
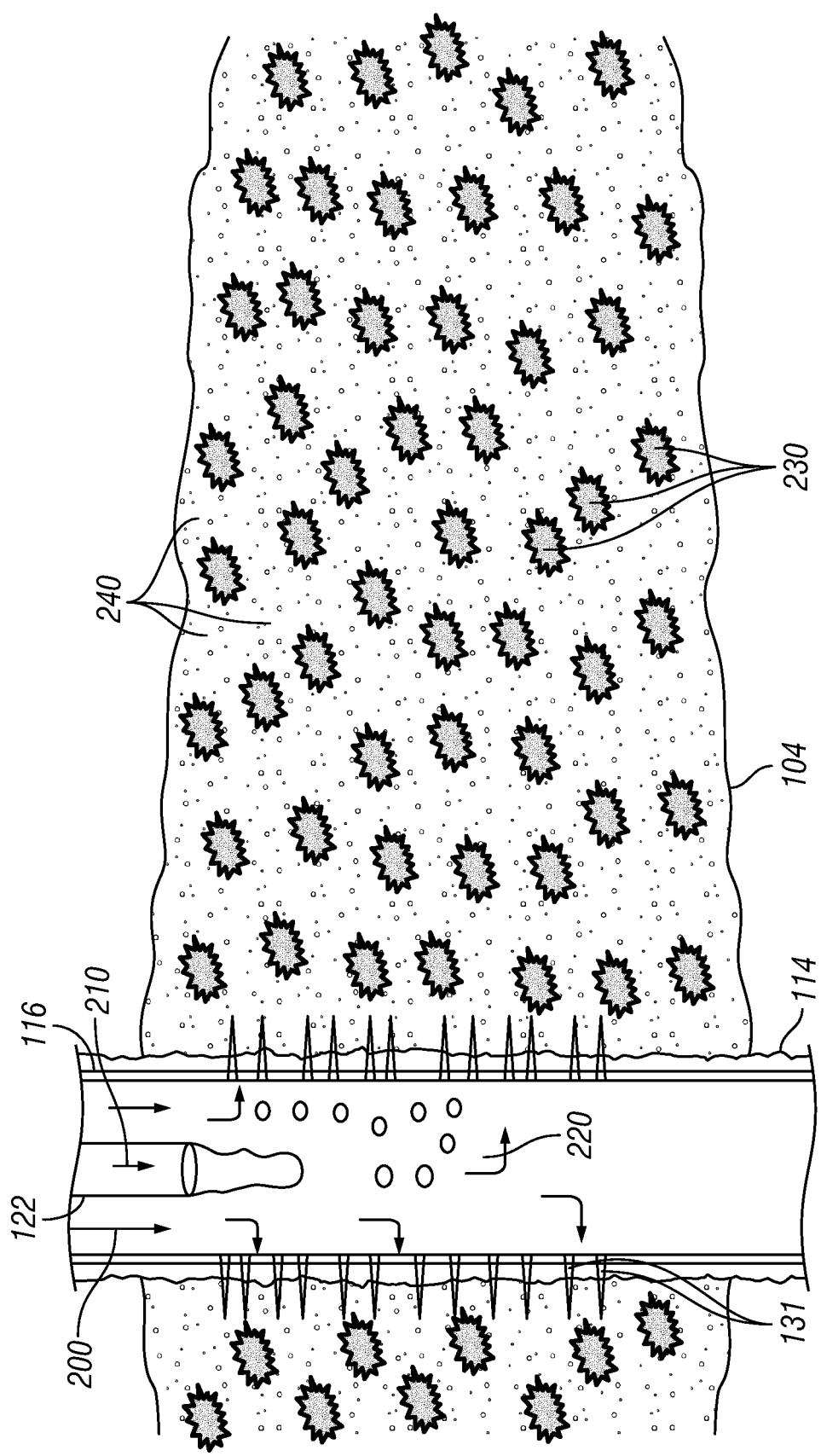
FIG. 3 depicts an enlarged partial cross-sectional view of a well system, according to one or more embodiments.

The proppant slurry 210 and the spacer fluid 200 may combine with each other in the wellbore 114, and ultimately in the formation 104, without any type of mixer or mixing action, thereby resulting in the fracturing fluid 220 having (e.g., portions) varied proppant concentrations. For example, as shown in FIG. 3, by not using a mixer, the proppant slurry 210 and the spacer fluid 200 may combine to create a fracturing fluid 220 having portions with different ratios of the proppant slurry 210 and the spacer fluid 200 (e.g., varied proppant concentrations), resulting in the fracturing fluid 220 having portions with higher concentrations of proppant 230 and portions with lower concentrations of proppant 240. The portions of the fracturing fluid 220 with higher concentrations of proppant 230 may be referred to as the proppant aggregates, in which these portions 230 may have concentrations of proppant higher or similar to that of the proppant slurry 210.

Also, as mentioned above, the spacer fluid 200 includes fibers (or other fillers or structures included therein), in which the fibers are degradable (or at least partially degradable). The fibers within the spacer fluid 200 may facilitate the proppant slurry 210 and the spacer fluid 200 from overly mixing. In particular, this may facilitate forming and pumping the fracturing fluid 220 with the portions having higher concentrations of proppant 230 and the portions having lower concentrations of proppant 240 into the formation 104, thereby keeping or maintaining the proppant slurry 210 and proppant aggregates separate from one another and from not (e.g., completely) mixing with the spacer fluid 200 within the wellbore 114 or formation 104. The fibers may then have a chance to degrade to enhance formation of voids or channels, or even proppant-free channels, within the fractures of the formation 104. This may enhance the ultimate distribution of proppant within fractures of formation 104 for later production. In particular, in one embodiment, the areas of the formation 104 (e.g., fractures of the formation 104) that have the portions of fracturing fluid 220 with higher concentrations of proppant 230 may increase the overall permeability of the formation 104 (e.g., more or larger channels or fractures), such as for hydrocarbons to flow through when being produced from the formation 104 and into the wellbore 114. This may have the effect of increasing the flow of hydrocarbons (e.g., decreasing the resistance against the flow of hydrocarbons) through the formation 104. For example, when producing hydrocarbons from the formation 104 and the wellbore 114, the hydrocarbons will flow along the path of least resistance through the formation 104 and into the wellbore 114. The hydrocarbons, thus, may flow through the formation 104 with the portions having higher concentrations of proppant 230, but more hydrocarbons probably will flow and be produced through the formation 104 with the portions having lower concentrations of proppant 230.

In one or more embodiments, when continuously pumping the spacer fluid 200 and/or the proppant slurry 210, the spacer fluid 200 and/or the proppant slurry 210 may be pumped at a constant or consistent volume flow rate, such as until the fracturing and placement of the fracturing fluid 220 into the formation 104 is complete. The spacer fluid 200 may be pumped into the wellbore 114 at a spacer fluid volume flow rate, and the proppant slurry 210 may be pumped into the wellbore 114 at a proppant slurry volume flow rate. The flow rates may be such that the fracturing fluid 220 includes more volume of spacer fluid 200 than proppant slurry 210. In particular, the proppant slurry volume flow rate may be between about 30 percent to 75 percent of the spacer fluid volume flow rate such that the fracturing fluid 220 includes more volume of spacer fluid 200 than proppant slurry 210.

In one or more embodiments, when nearing the end of the fracturing and placing of the fracturing fluid 220 into the formation 104 method or process, the pumping of the spacer fluid 200 may cease such that only pumping of the proppant slurry 210 is occurring. This may result in only proppant slurry 210 being pumped into the formation 104 at the end of the fracturing process. Accordingly, a high concentration of proppant may be introduced into the formation 104 near the wellbore 114 to increase the conductivity or porosity of the formation 104 near the wellbore 114. This may facilitate when hydrocarbons are produced from the formation 104, such as to reduce the resistance to the flow of hydrocarbons towards and into the wellbore 114.

Further, in one or more embodiments, once the pumping of the spacer fluid 200 and the proppant slurry 210 into the wellbore 114 has ceased, pressure may be released from the wellbore 114 (e.g., the fracturing fluid 220 in the formation 104), at least the pressure that is above the fracturing pressure of the formation 104. This may be done to allow the proppant within the fracturing fluid 220 to set within the fractures of the formation 104. For example, as the spacer fluid 200, and hence fracturing fluid 220, may include degradable fibers, this may allow the fibers to degrade and to enhance formation of voids or channels, or even proppant-free channels, within the fractures of the formation 104. This may enable the fractures formed within the formation 104 to close (e.g., at least partially) as or before the fibers within the fracturing fluid 220 begin to degrade, thereby preventing the proppant from further settling or moving within the formation 104.

In addition to the embodiments described above, many examples of specific combinations are within the scope of the disclosure, some of which are detailed below:

Example 1

A method of fracturing a formation with a fracturing fluid in a wellbore extending into the formation, the method comprising:
pumping a spacer fluid through a spacer fluid channel into the wellbore;
pumping a proppant slurry through a proppant slurry channel into the wellbore separately from the spacer fluid;
combining the spacer fluid and the proppant slurry within the wellbore to create the fracturing fluid with portions comprising varied proppant concentrations; and
pumping the fracturing fluid with the varied proppant concentrations into the formation.

Example 2

The method of Example 1, further comprising pumping the proppant slurry by positioning a conduit within the wellbore and pumping the proppant slurry through the conduit.

Example 3

The method of Example 2, wherein the conduit comprises at least one of coiled tubing and drill pipe.

Example 4

The method of Example 2, wherein the spacer fluid channel comprises an annulus formed about the conduit within the wellbore and further comprising pumping the spacer fluid through the annulus.

Example 5

The method of Example 1, wherein pumping the spacer fluid comprises continuously pumping the spacer fluid into the wellbore at a constant volume flow rate.

Example 6

The method of Example 1, wherein pumping the proppant slurry comprises continuously pumping the proppant slurry into the wellbore at a constant volume flow rate.

Example 7

The method of Example 1, wherein:
pumping the spacer fluid comprises pumping the spacer fluid into the wellbore without any pulsing of the spacer fluid; and
pumping the proppant slurry comprises pumping the proppant slurry into the wellbore without any pulsing of the proppant slurry.

Example 8

The method of Example 1, further comprising pumping the proppant slurry and pumping the spacer fluid simultaneously.

Example 9

The method of Example 1, further comprising combining the spacer fluid and the proppant slurry within the wellbore without a mixer.

Example 10

The method of Example 1, further comprising pumping the fracturing fluid into the formation at a pressure above a fracturing pressure of the formation.

Example 11

The method of Example 1, further comprising ceasing pumping of the spacer fluid and only pumping the proppant slurry into the formation before ceasing all pumping of the spacer fluid and the proppant slurry.

Example 12

The method of Example 1, further comprising pumping the proppant slurry at a volume flow rate between 30 to 75 percent of a volume flow rate of the spacer fluid.

Example 13

The method of Example 1, further comprising ceasing pumping of the spacer fluid and the proppant slurry.

Example 14

The method of Example 13, wherein the spacer fluid comprises degradable fibers, the method further comprising releasing the pressure above the fracturing pressure of the formation from the wellbore until the degradable fibers at least partially degrade.

Example 15

The method of Example 14, wherein the degradable fibers comprise at least one of homopolymer, random aliphatic polyester, block aliphatic polyester, graft aliphatic polyester, star-branched aliphatic polyester, and hyper-branched aliphatic polyester.

Example 16

A method of fracturing a formation with a fracturing fluid in a wellbore extending into the formation, the method comprising:
continuously pumping a spacer fluid through a spacer fluid channel into the wellbore;
continuously pumping a proppant slurry through a proppant slurry channel into the wellbore separately from the spacer fluid;
combining the spacer fluid and the proppant slurry within the wellbore to create the fracturing fluid; and
pumping the fracturing fluid into the formation.

Example 17

The method of Example 16, wherein:
the spacer fluid and the proppant slurry are combined within the wellbore without a mixer to create the fracturing fluid with portions comprising varied proppant concentrations; and
the spacer fluid and the proppant slurry are pumped into the wellbore without any pulsing.

Example 18

The method of Example 16, further comprising pumping the proppant slurry by positioning a conduit within the wellbore and continuously pumping the proppant slurry through the conduit.

Example 19

The method of Example 18, wherein the spacer fluid channel comprises an annulus formed about the conduit within the wellbore and further comprising continuously pumping the spacer fluid through the annulus.

Example 20

The method of Example 16, further comprising:
ceasing pumping of the spacer fluid and the proppant slurry while maintaining a pressure above a fracturing pressure of the formation in the wellbore until degradable fibers of the spacer fluid at least partially degrade;
releasing the pressure above the fracturing pressure of the formation from the wellbore until degradable fibers of the spacer fluid at least partially degrade; and
producing hydrocarbons through the formation and into the wellbore.

This discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

Within this document, a reference identifier may be used as a general label, for example "101," for a type of element and alternately used to indicate a specific instance or characterization, for example "101A" and 101B," of that same type of element.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A method of fracturing a formation with a fracturing fluid in a wellbore extending into the formation, the method comprising:
    pumping a spacer fluid through a spacer fluid channel into the wellbore;
    continuously pumping a proppant slurry through a proppant slurry channel into the wellbore separately from the spacer fluid at a constant volume flow rate that is between 30 to 75 percent of a volume flow rate of the spacer fluid;
    combining the spacer fluid and the proppant slurry within the wellbore without the use of a mixer to create proppant aggregates in the fracturing fluid, resulting in the fracturing fluid having varied concentrations of the proppant slurry and the spacer fluid, wherein the fracturing fluid contains portions with higher concentrations of proppant and portions with lower concentrations of proppant, such that the portions of the fracturing fluid with the higher concentrations are the proppant aggregates; and
    pumping the fracturing fluid with the varied proppant concentrations into the formation.

2. The method of claim 1, further comprising pumping the proppant slurry by positioning a conduit within the wellbore and pumping the proppant slurry through the conduit.

3. The method of claim 2, wherein the conduit comprises at least one of coiled tubing and drill pipe.

4. The method of claim 2, wherein the spacer fluid channel comprises an annulus formed about the conduit within the wellbore and further comprising pumping the spacer fluid through the annulus.

5. The method of claim 1, wherein pumping the spacer fluid comprises continuously pumping the spacer fluid into the wellbore at a constant volume flow rate.

6. The method of claim 1, further comprising pumping the proppant slurry and pumping the spacer fluid simultaneously.

7. The method of claim 1, further comprising pumping the fracturing fluid into the formation at a pressure above a fracturing pressure of the formation.

8. The method of claim 7, wherein the spacer fluid comprises degradable fibers, the method further comprising releasing the pressure above the fracturing pressure of the formation from the wellbore before the degradable fibers at least partially degrade.

9. The method of claim 8, wherein the degradable fibers comprise at least one of homopolymer, random aliphatic polyester, block aliphatic polyester, graft aliphatic polyester, star-branched aliphatic polyester, and hyper-branched aliphatic polyester.

10. The method of claim 1, further comprising ceasing pumping of the spacer fluid and only pumping the proppant slurry into the formation before ceasing all pumping of the spacer fluid and the proppant slurry.

11. The method of claim 1, further comprising ceasing pumping of the spacer fluid and the proppant slurry.

12. The method of claim 1, wherein pumping the spacer fluid comprises pumping the spacer fluid into the wellbore without any pulsing of the spacer fluid.

13. A method of fracturing a formation with a fracturing fluid in a wellbore extending into the formation, the method comprising:
    continuously pumping a spacer fluid through a spacer fluid channel into the wellbore;
    continuously pumping a proppant slurry through a proppant slurry channel into the wellbore separately from the spacer fluid at a constant volume flowrate that is between 30 to 75 percent of a volume flow rate of the spacer fluid;
    combining the spacer fluid and the proppant slurry within the wellbore without the use of a mixer to create proppant aggregates in the fracturing fluid, resulting in the fracturing fluid having varied concentrations of the proppant slurry and the spacer fluid, wherein the fracturing fluid contains portions with higher concentrations of proppant and portions with lower concentrations of proppant, such that the portions of the fracturing fluid with the higher concentrations are the proppant aggregates; and
    pumping the fracturing fluid into the formation.

14. The method of claim 13, wherein: the spacer fluid and the proppant slurry are combined within the wellbore without a mixer to create the fracturing fluid with portions comprising varied proppant concentrations; and the spacer fluid and the proppant slurry are pumped into the wellbore without any pulsing.

15. The method of claim 13, further comprising pumping the proppant slurry by positioning a conduit within the wellbore and continuously pumping the proppant slurry through the conduit.

16. The method of claim 15, wherein the spacer fluid channel comprises an annulus formed about the conduit within the wellbore and further comprising continuously pumping the spacer fluid through the annulus.

17. The method of claim 13, wherein the spacer fluid comprises degradable fibers and the method further comprises:
    ceasing pumping of the spacer fluid and the proppant slurry;
    reducing a pressure of the wellbore below a fracturing pressure of the formation until the degradable fibers of the spacer fluid at least partially degrade; and
    producing hydrocarbons through the formation and into the wellbore.

* * * * *